(12) United States Patent
Sherony et al.

(10) Patent No.: US 10,449,898 B2
(45) Date of Patent: Oct. 22, 2019

(54) SYSTEMS AND METHODOLOGIES FOR PROVIDING SUPPLEMENTARY INFORMATION BASED ON ALERTS IN A VEHICLE

(71) Applicant: TOYOTA MOTOR ENGINEERING & MANUFACTURING NORTH AMERICA, INC., Erlanger, KY (US)

(72) Inventors: Rini Sherony, Ann Arbor, MI (US); Tina Brunetti Sayer, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/167,360

(22) Filed: May 27, 2016

(65) Prior Publication Data

US 2017/0341578 A1    Nov. 30, 2017

(51) Int. Cl.
| | |
|---|---|
| *B60Q 9/00* | (2006.01) |
| *G08G 1/16* | (2006.01) |
| *B60W 50/14* | (2012.01) |
| *G06K 9/00* | (2006.01) |
| *G08G 1/0962* | (2006.01) |

(52) U.S. Cl.
CPC .......... *B60Q 9/008* (2013.01); *B60W 50/14* (2013.01); *G06K 9/00* (2013.01); *G06K 9/00791* (2013.01); *G08G 1/09626* (2013.01); *G08G 1/165* (2013.01); *G08G 1/166* (2013.01); *G08G 1/167* (2013.01); *G08G 1/168* (2013.01)

(58) Field of Classification Search
None
See application file for complete search history.

(56) References Cited

U.S. PATENT DOCUMENTS

| | | | | |
|---|---|---|---|---|
| 3,809,462 A | * | 5/1974 | Baumgardner | B60R 1/001 359/726 |
| 4,800,377 A | * | 1/1989 | Slade | B60Q 1/444 324/161 |
| 5,451,758 A | * | 9/1995 | Jesadanont | G07B 15/063 235/384 |
| 6,119,068 A | * | 9/2000 | Kannonji | B60Q 9/008 180/271 |
| 6,166,631 A | * | 12/2000 | Kennedy | B60Q 9/00 340/439 |
| 6,175,305 B1 | * | 1/2001 | Johnson | B60Q 1/444 340/463 |
| 6,333,687 B1 | * | 12/2001 | LaBelle | B60Q 1/54 340/463 |

(Continued)

*Primary Examiner* — Fekadeselassie Girma
(74) *Attorney, Agent, or Firm* — Oblon, McClelland, Maier & Neustadt, L.L.P.

(57) ABSTRACT

Systems and methods are provided for providing supplementary alert information. The method includes monitoring, using processing circuitry, one or more systems in a vehicle to determine an alert mode when an alert is generated. The method further includes identifying, using the processing circuitry, supplementary alert information associated with the alert mode. The supplementary alert information includes an explanation of a trigger of the alert. The method further includes outputting the supplementary alert information to a user of the vehicle.

17 Claims, 9 Drawing Sheets

(56) References Cited

U.S. PATENT DOCUMENTS

| | | | | |
|---|---|---|---|---|
| 6,961,445 B1* | 11/2005 | Jensen | | G08B 13/194 |
| | | | | 348/208.15 |
| 8,392,062 B2 | 3/2013 | Oechsle et al. | | |
| 8,983,706 B2 | 3/2015 | Hartmann et al. | | |
| 9,082,308 B2 | 7/2015 | Armitage et al. | | |
| 9,132,774 B2 | 9/2015 | Kiefer et al. | | |
| 9,783,202 B2* | 10/2017 | Yamada | | B60W 50/08 |
| 9,994,235 B2* | 6/2018 | Prokhorov | | B60W 50/16 |
| 2006/0050018 A1* | 3/2006 | Hutzel | | B60K 35/00 |
| | | | | 345/60 |
| 2006/0164230 A1* | 7/2006 | DeWind | | B60K 35/00 |
| | | | | 340/461 |
| 2013/0015966 A1* | 1/2013 | Soomro | | G08B 25/004 |
| | | | | 340/502 |
| 2013/0060400 A1* | 3/2013 | Hahne | | G08G 1/161 |
| | | | | 701/1 |
| 2014/0204726 A1* | 7/2014 | Nagasawa | | H04L 41/0604 |
| | | | | 370/216 |
| 2015/0022426 A1* | 1/2015 | Ng-Thow-Hing | | G06T 19/00 |
| | | | | 345/7 |
| 2015/0070160 A1 | 3/2015 | Davidsson et al. | | |
| 2015/0142250 A1* | 5/2015 | Cavender-Bares | | A01C 7/00 |
| | | | | 701/23 |
| 2015/0161913 A1 | 6/2015 | Dominguez et al. | | |
| 2015/0203030 A1 | 7/2015 | Knobl et al. | | |
| 2015/0210272 A1 | 7/2015 | Edgren | | |
| 2015/0232021 A1* | 8/2015 | Downey | | B60Q 1/525 |
| | | | | 340/903 |
| 2015/0242953 A1* | 8/2015 | Suiter | | G06Q 40/08 |
| | | | | 705/4 |
| 2015/0348335 A1* | 12/2015 | Ramanujam | | G07C 5/006 |
| | | | | 701/23 |
| 2016/0107688 A1* | 4/2016 | Schwarzkopf | | G01C 21/32 |
| | | | | 701/41 |
| 2016/0202700 A1* | 7/2016 | Sprigg | | B60Q 9/00 |
| | | | | 701/23 |
| 2016/0327953 A1* | 11/2016 | Nilsson | | B60W 50/0097 |
| 2016/0358453 A1* | 12/2016 | Wassef | | G08B 25/016 |
| 2017/0002820 A1* | 1/2017 | Benim | | F04D 27/001 |
| 2017/0291544 A1* | 10/2017 | Ishihara | | B60K 35/00 |
| 2018/0194345 A1* | 7/2018 | Stefan | | H04W 4/00 |
| 2018/0267542 A1* | 9/2018 | Lamon | | G05D 1/024 |

\* cited by examiner

SYSTEMS AND METHODOLOGIES FOR PROVIDING SUPPLEMENTARY INFORMATION BASED ON ALERTS IN A VEHICLE

BACKGROUND

Advanced driver assistance systems (ADAS) and autonomous and/or semiautonomous vehicles generate a plurality of alerts to assist drivers. The drivers may be unfamiliar with the plurality of alerts. U.S. Pat. No. 9,132,774 B2 entitled "Alert systems and methods for a vehicle" by Kiefer et al. describes systems and methods for generating alerts to a driver of a vehicle based on condition data from collision warning/avoidance systems.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

The present inventors recognized that it would be beneficial if information associated with the plurality of alerts generated by ADAS and/or AV is provided to the drivers.

According to an embodiment of the present disclosure, there is provided a method for providing supplementary alert information. The method includes monitoring, using processing circuitry, one or more systems in a vehicle to determine an alert mode when an alert is generated. The method further includes identifying, using the processing circuitry, information associated with the alert mode. The supplementary alert information is an explanation of a trigger of the alert. The method further includes outputting, using the processing circuitry, the supplementary alert information to a user of the vehicle.

According to an embodiment of the present disclosure, there is provided a non-transitory computer-readable medium storing instructions which, when executed by at least one processor, cause the at least one processor to perform the above-described method for providing the supplementary alert information.

According to an embodiment of the present disclosure, there is provided a system for providing the supplementary alert information. The system includes one or more alert systems and processing circuitry. The processing circuitry is configured to monitor one or more systems in a vehicle to determine an alert mode when an alert is generated. The processing circuitry is further configured to identify information associated with the alert mode. The supplementary alert information includes an explanation of a trigger of the alert. The processing circuitry is further configured to output the supplementary alert information to a user of the vehicle.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to systems and methodologies for providing supplementary alert information in a vehicle.

Further, as used herein, the words "a", "an" and the like generally carry a meaning of "one or more," unless stated otherwise.

The system and associated methodology provide training for users on warnings that may be issued in any vehicle. The system described herein provides a driver of any vehicle supplementary alert information while he/she is driving the vehicle. The limited supplementary alert information is provided shortly after a warning/alert is activated in a vehicle (e.g., when the vehicle is parked). The information includes an explanation about the reason that triggered the warning/auto braking/auto steering functionality (collectively referred to herein as alerts). That way, drivers become more familiar with the vehicle's systems and become more accustomed to the alerts while driving.

Vehicles with at least some ADAS and/or semiautonomous/autonomous functionality have been introduced to the market. Training on these vehicles is minimal. For example, manufacturers may require the salesman at a dealership to attend a location (e.g., training centers) to train on specific features of a vehicle. However, consumers, the people who will actually be driving the vehicle, are not provided with any formal training beyond what is conveyed to them by the salesman.

A plurality of alerts and warnings may be generated in the ADAS equipped or autonomous/semiautonomous vehicle. The plurality of alerts may include one or more haptic alerts (e.g., vehicle seat, steering wheel, one or more pedals), one or more auditory alerts (e.g., warning chimes or beeps), and one or more visual alerts (warning lamps, an information center, a screen of an infotainment system, a led panel, a head up display, and a display reflected off windshield).

In addition, each alert (or alert mode) may have different features settings associated with the plurality of alerts. For example, an intensity of a vibration, a duration of the vibration, a rate of the vibration, and/or frequency of the vibration, an occurrence of an auditory alert, a sound level, a sound type (e.g., particular narrow-band chime or broadband auditory warning signal), a duration of the auditory alert, a visual type of the visual alert (e.g., a particular color, symbol), a duration of the visual alert may be associated with the plurality of alerts. For example, a lower sound level may be associated with a low priority alert while a higher sound level may be associated with an imminent warning that requires an immediate action from the driver.

The supplementary alert information can provide information related to the braking and/or steering functionality. For example, in the event that the driver begins to veer into another lane, the vehicle is able to provide an alert or provide lateral steering control. A warning to the driver can be provided indicating that correction of lane keeping is needed (e.g., vibration of the steering wheel). In some instances, especially when the driver has not received a particular warning beforehand, the driver may be unaware as to why the warning occurred. The driver may not understand why the steering wheel has vibrated. The vehicle can indicate audibly "the steering wheel vibrated because your car appears to unintentionally deviating into the right lane." As a result, the driver will be able to associate exactly the situation that occurred (e.g., vehicle veering) in the vehicle with the resulting warning (e.g., vibration of the steering wheel) so that over time, alerts can be learned. In one example, once the driver becomes comfortable with the alerts in the vehicle, the driver may be provided with the option to turn the supplementary alert information off using a user interface.

The supplementary alert information can be provided in various forms. For example, the information can be audible or visual. The form of the supplementary alert information may be based on the form of the actual vehicle alert that was activated. For example, when a visual alert was activated, the actual message is displayed. The supplementary information is presented when the vehicle is stopped and in park. In addition, the supplementary alert information may be supplemented with videos. The videos can include actual camera footage of what transpired to trigger the warning.

Figure 1:
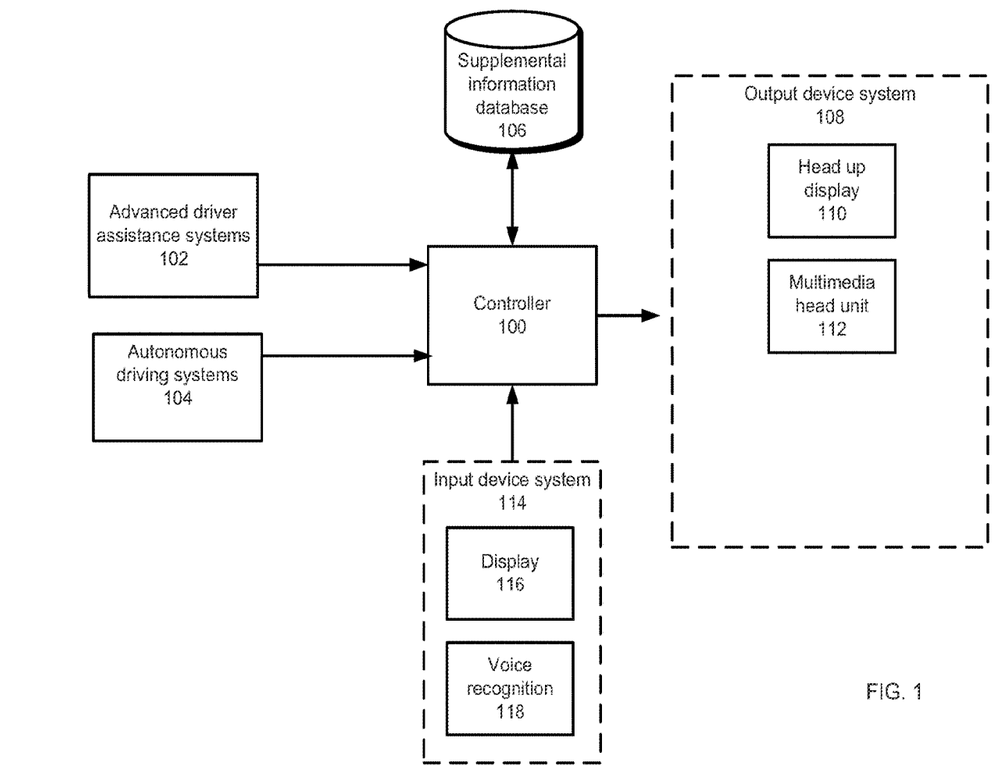
FIG. 1 is a block diagram representation of a system for providing the supplementary alert information to a driver according to one example.

FIG. 1 is a schematic diagram of a system for providing supplementary alert information according to one example. The vehicle may include a controller 100, one or more advanced driver assistance systems (ADAS) 102, one or more semiautonomous/autonomous driving systems 104, a supplementary alert information database 106, an output device system 108, and an input device system 114. The vehicle may also include cameras, radars, and sensors by which the surroundings of the vehicle are observed. Supplementary alert information may include data captured by the cameras, radars, and sensors. For example, the cameras may record a video that may be used to generate the supplementary alert information, as it will be described further below.

Figure 2:
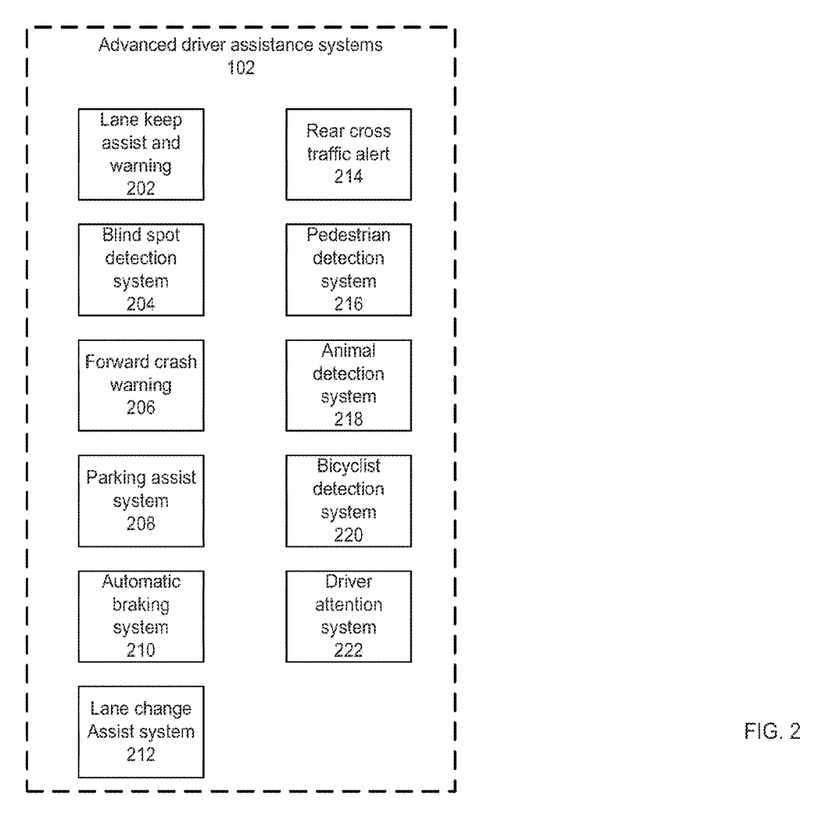
FIG. 2 is a block diagram representation of advanced driver assistance systems according to one example.
Figure 3:
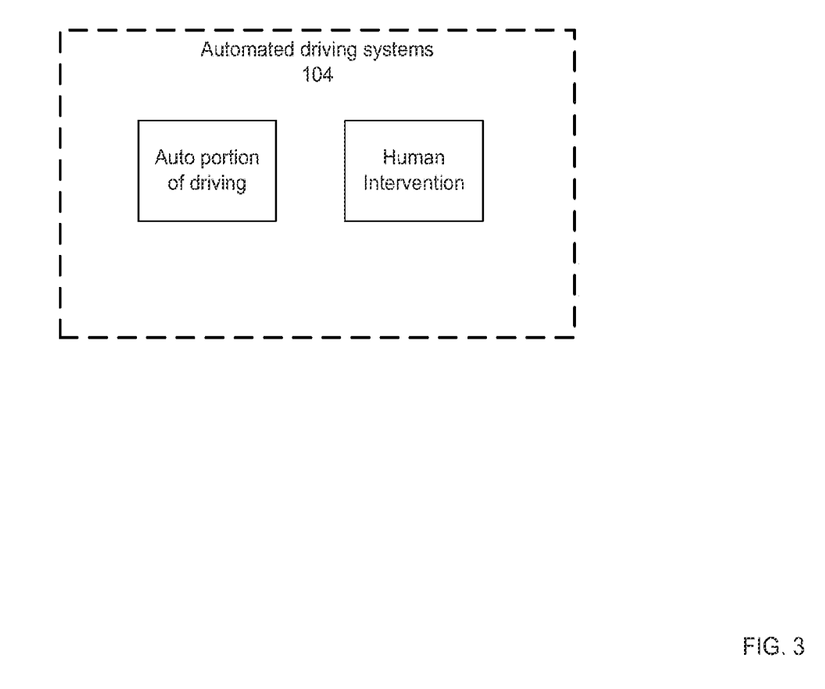
FIG. 3 is a block diagram representation of semiautonomous/autonomous driving systems according to one example.

Exemplary advanced driver assistance systems are shown in FIG. 2. Exemplary semiautonomous/autonomous driving systems are shown in FIG. 3.

Figure 9:
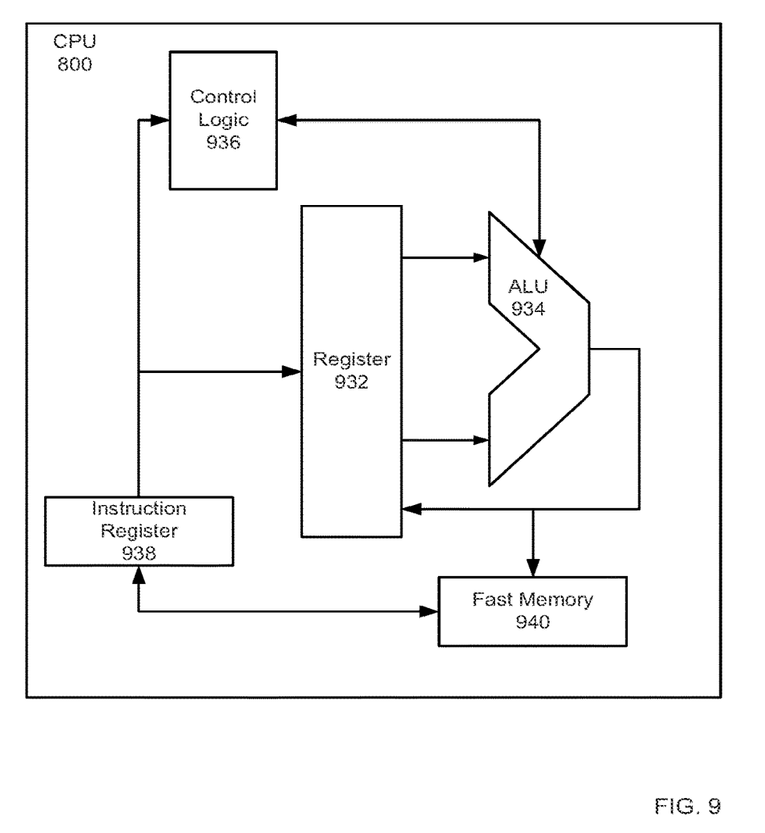
FIG. 9 is an exemplary block diagram of a central processing unit according to one example.

The vehicle may be a car, a bus, a truck, or similar vehicle having semi or fully autonomous driving capabilities. In one embodiment, the controller 100 includes a CPU 900 and a memory 902, as shown in FIG. 9.

The controller 100 may detect that an alert is generated in the vehicle. For example, the controller 100 may receive a signal from the ADAS 102 and/or the semiautonomous/autonomous driving systems 104 indicating that an alert is generated. The controller 100 generates the supplementary alert information as a function of the signal received from the advanced driver assistance systems 102 and/or from the semiautonomous/autonomous driving systems 104. The controller 100 may retrieve the predefined supplementary alert information from the supplementary alert information database 106. Then, the predefined supplementary alert information is sent to the output device system 108 for outputting to the driver.

Modules and systems described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

The supplementary alert information database 106 stores supplementary alert information associated with each of the plurality of alerts. In addition, the supplementary alert information database 106 may store predefined supplementary alert and/or user configured supplementary alert settings, as will be discussed in more detail below.

The supplementary alert information database 106 can include volatile memory that temporary stores the settings, non-volatile memory that storing across key cycles, or a combination of volatile and non-volatile memory.

In one example, the supplementary alert information database 106 may be in the vehicle, in a plug-in vehicle accessory device, in user removable storage (e.g., USB flash drive, Secure Digital SD, etc.), in the memory of a user device (e.g., user smart phone or key fob), or in a cloud database.

In one example, the settings for presenting the supplementary alert information may include the output type (e.g., audio, video), preferable volume setting, voice settings (e.g., female voice, male voice), and the like. The settings may also include the language. In other examples, the language may be automatically determined as a function of the location of the vehicle. The location of the vehicle may be determined using localization circuitry such as GPS (Global Positioning System) or other localization methods as would be understood by one of ordinary skill in the art.

In addition, the supplementary alert information may be turned on and off by the driver. For example, once the driver becomes familiar with the alerts, the supplementary alert information may be turned off In one example, each alert mode may be associated with a predetermined threshold. The supplementary alert information system is activated for the alert mode until the predetermined threshold is reached. The predetermined threshold may be set by the driver and/or set by the vehicle manufacture. Each time the supplementary alert information associated with a first alert is generated by the controller 100, a first counter may be updated by an incremental value. In response to determining that the first counter has reached the predetermined threshold, the controller 100 may not output the supplementary alert information once the first alert is generated in the future.

In one example, the supplementary alert information may be provided for specific drivers. The supplementary alert information system may be activated as a function of the driver identity. For example, the controller 100 may check whether the driver is a new driver. In response to determining that the driver is a new driver, the supplementary alert information system is activated. In one example, when the driver is a student driver, the supplementary alert information system is activated. In one example, the driver identity may be determined by entering a password or a code, or using fingerprint verification circuitry as would be understood by one of ordinary skill in the art.

The output device system 108 may include a head up display 110 and a multimedia head unit 112. The head up display 110 may be based on micro display imaging technologies including liquid crystal display (LCD), liquid crystal on silicon (LCoS), digital micro-mirrors (DMD), and organic light-emitting diode (OLED). The multimedia head unit 112 may be located in the center of a dashboard of the vehicle. The multimedia head unit 112 controls one or more loudspeakers distributed in the vehicle. The multimedia head unit 112 may display navigation information, audio, heating, ventilating, and air-conditioning (HVAC) information, and other information. The multimedia head unit 112 may also include a display.

The input device system 114 may include a multiple touch input device 116 and a voice recognition system 118.

The multiple touch input device 116 may be a touchscreen including a touch sensitive surface or a display overlaid with the touch sensitive surface such as a multi-touch input surface (MTIS). Multiple technologies exist for detecting a user's touch using a touch sensitive surface including capacitive technologies, resistive technologies, optical technologies, wave technologies, or other technologies as would be understood by one of ordinary skill in the art.

The display may be a liquid crystal display using fluorescent or light emitting diode (LED) back lighting, an LED display, or other flat panel display as would be understood by one of ordinary skill in the art. The display may be of different sizes.

In one embodiment, the MTIS based on resistive technology may include a flexible plastic front sheet and hardboard coated with a thin resistive film. The resistive sides of each are separated by an air gap of two-thousandths of an inch. Pressure applied to the surface of the front sheet closes the gap and is registered as a contact point. This contact point is then converted from an analog signal to a serial data stream which is processed by the input device system 114.

In one embodiment, the MTIS may be based on capacitive technology. The capacitive technology may be based on mutual capacitance where the object such as a user's finger or a stylus pen alters the mutual coupling between row and column electrodes, which are scanned sequentially. The row and column electrodes are obtained by etching a conductive layer. In other embodiments, the capacitive technology may be based on self capacitance where the object loads the sensor or increases the parasitic capacitance to ground. In one embodiment, the MTIS may be based on optical technology. Infrared light is shinned at the display from below the touch surface. A diffuser is placed on top or on bottom of the touch surface. When an object touches the surface it reflects more light than the diffuser or objects in the background, the extra light is sensed by one or more cameras.

The voice recognition system 118 may include one or more microphones and processing circuitry configured to detect a user input and map the user input to command to the controller 100 as would be recognized by one of ordinary skill in the art.

FIG. 2 is a block diagram that shows a plurality of advanced driver assistance systems (ADAS) 102 according to one example. The plurality of ADAS 102 may include a lane keep assist and warning system 202, a blind spot detection system 204, a forward crash warning system 206, a parking assist system 208, an automatic braking system 210, a lane change assist system 212, a rear cross traffic alert system 214, a pedestrian detection system 216, an animal detection system 218, a bicyclist detection system 220, and a driver attention system 222. The ADAS 102 may also include pothole, construction, speed, and obstacles detection systems.

FIG. 3 is a block diagram that shows one or more semiautonomous/autonomous driving systems 104 according to one example. The plurality of semiautonomous/autonomous driving systems 104 may include self parking systems, autonomous steering systems, and the like. Alerts from the semiautonomous/autonomous driving systems 104 may have different levels. For example, a first level may indicate that human intervention is needed immediately (imminent) such as when a malfunction is detected in the one or more semiautonomous/autonomous systems. Another level may indicate that a more casual human intervention is needed (e.g., action needed in 5 mins) when an auto portion of drive is ending or beginning, and the like. The one or more semiautonomous/autonomous driving systems 104 may include processing circuitry, which controls an engine, a steering system (e.g., steering wheel), and brakes.

Figure 4:
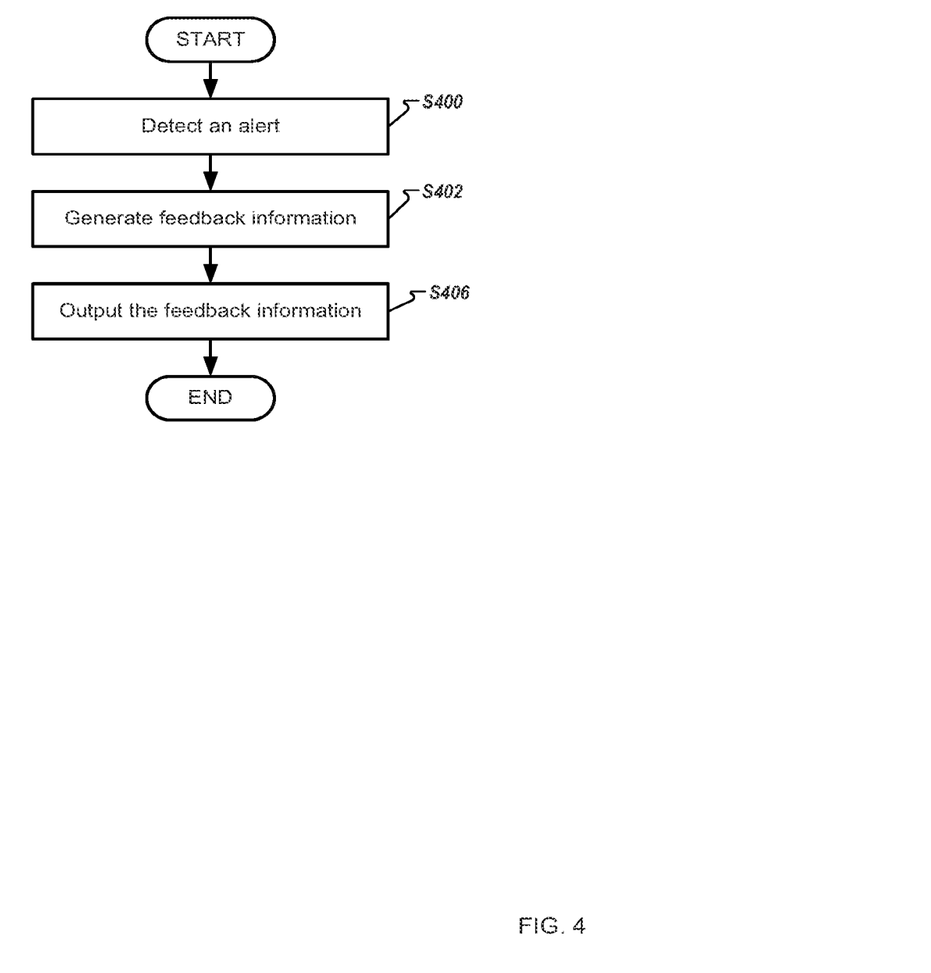
FIG. 4 is a flow chart illustrating a method for generating the supplementary alert information according to one example.

FIG. 4 is a flow chart illustrating a method for providing supplementary alert information according to one example. At step S400, the controller 100 may detect a signal indicating that an alert is generated. In addition, the signal indicates the alert mode (type). As described previously herein, the signal may be generated by the ADAS 102. At step S402, supplementary alert information associated with the alert mode is retrieved from the supplementary alert information database 106 and/or the memory 902. At step S404, the supplementary alert information is outputted to the driver via the output device system 108.

Figure 5:
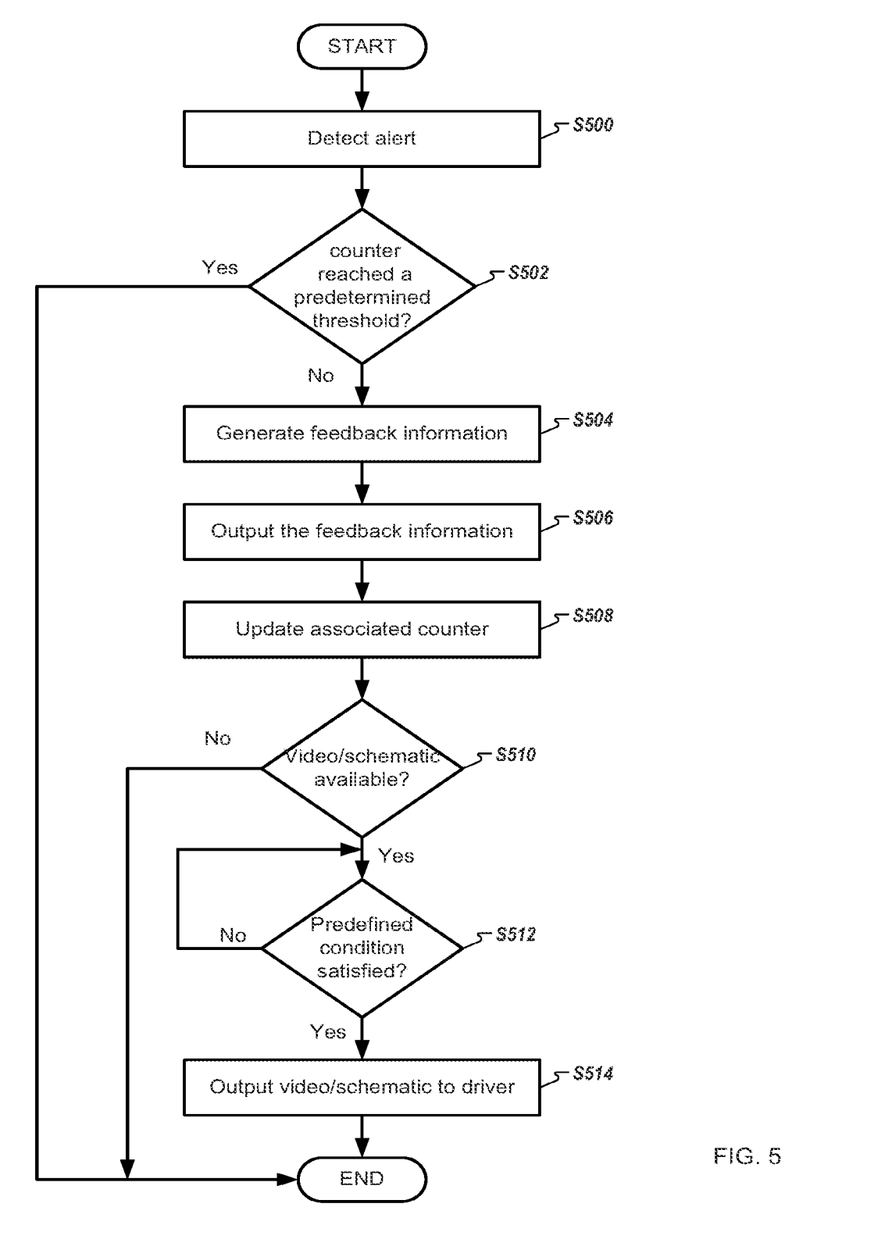
FIG. 5 is a flow chart illustrating a method for generating the supplementary alert information according to one example.

FIG. 5 is a flow chart illustrating a method for information supplementary alert generation according to one example. At step S500, the controller 100 may detect a signal indicating an alert mode.

At step S502, the controller 100 may check to see whether a first counter associated with the alert mode has reached a predetermined threshold. In one example, the controller 100 may use a look-up table to determine the predetermined threshold associated with the alert mode. The look-up table may be stored in the supplementary alert information database 106. In response to determining that the first counter has reached the predetermined threshold, the process ends. In response to determining that the first counter has not reached the predetermined threshold, the flow goes to step S504.

At step S504, the supplementary alert information associated with the alert mode is retrieved from the supplementary alert information database 106 and/or the memory 902. In addition, the controller 102 may retrieve the predefined settings associated with the alert mode from the supplementary alert information database 106. The predefined settings may be a function of the driver identity. The driver identity may be determined through voice recognition or by entering a passcode, for example.

At step S506, the supplementary alert information is outputted to the driver via the output device system 108. Then, at step S508, the first alert count/number is increased by a predetermined increment, such as one.

At step S510, the controller 100 may check to see whether supplemental supplementary alert information is associated with the alert mode. The supplemental supplementary alert may include a video showing vehicle conditions that triggered the alert. In response to determining that supplemental supplementary alert information is not available for the type of the alert, the process ends. In response to determining that supplemental supplementary alert is available, the flow goes to step S512.

At step S512, the controller 100 may check to see whether a predetermined condition is satisfied before outputting the supplemental supplementary alert information. For example, the controller 100 may check whether the vehicle is stopped. In other examples, the controller 100 may check whether the vehicle is moving below a predetermined speed. In response to determining that the predetermined condition is satisfied, the flow goes to step S514. In response to determining that the condition is not satisfied, the controller 100 may perform a wait and then the flow goes back to step S512. In other examples, the controller 100 may perform a wait until a user request to display the supplemental supplementary alert information is received. That is, the driver may request the display of the supplemental supplementary alert information via the input device system 114.

At step S516, the supplemental supplementary alert information may be outputted to the driver through the output device system 108 or other user interface. The supplemental supplementary alert information may be a video that shows an actual footage of the reason that triggered the alert. In one example, the video or other schematic information may only be displayed when the car is park. The video may be captured by the one or more cameras included in the vehicle. For example, the video may show a pedestrian crossing that was the cause for the alert from the automatic braking system 210 activation.

The supplemental supplementary alert information may include a schematic and/or a graphic simulation. The schematic and/or graphic simulation may be generated as a function of positional data of the vehicle prior to the generation of the alert. An exemplary schematic generated is shown in FIG. 7.

Steps may be omitted from the above-discussed process or steps may be performed in a different order.

Figure 6:
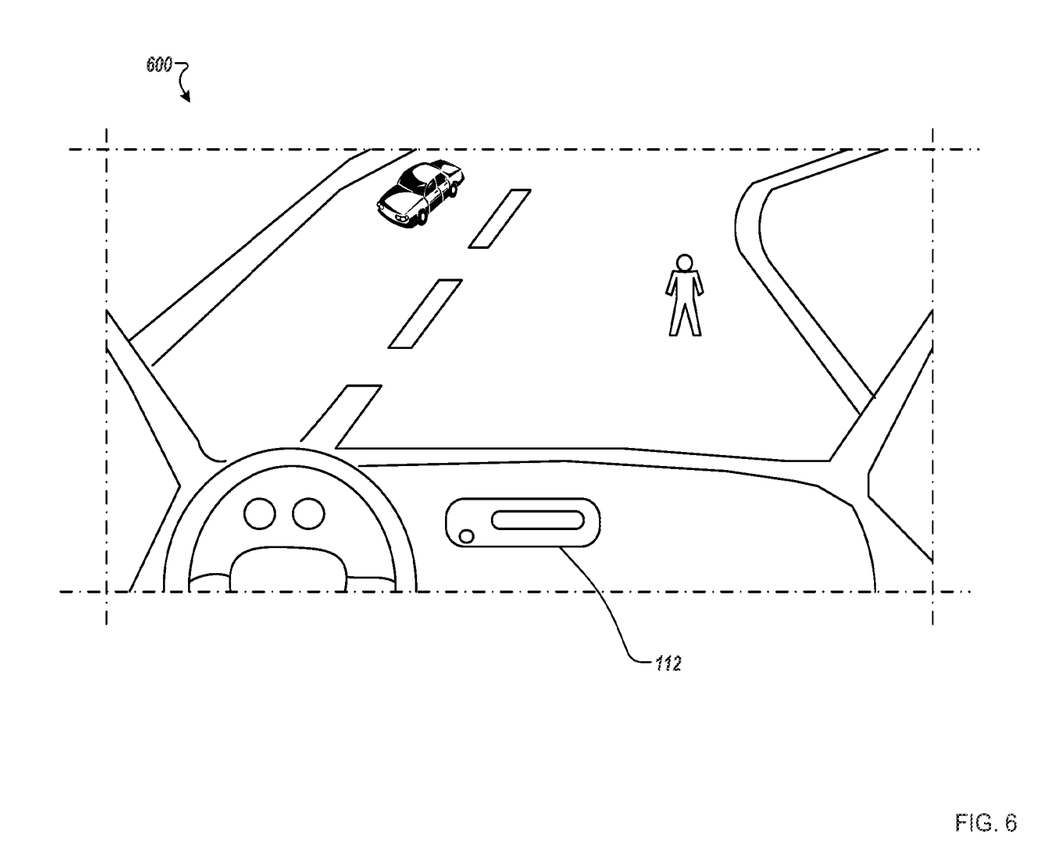
FIG. 6 is a schematic that shows the limited supplementary alert information according to one example.

FIG. 6 is a schematic that shows supplementary alert information according to one example. Schematic 600 shows a front console of a vehicle equipped with the supplementary alert information system. The controller 100 receives an alert from the automatic braking system 210 indicating that the automatic braking system has been activated. Then, the controller 100 may output the supplementary alert information through the multimedia head unit 112. The supplementary alert information may be "The automatic braking system was activated because of the presence of an obstacle".

Figure 7:
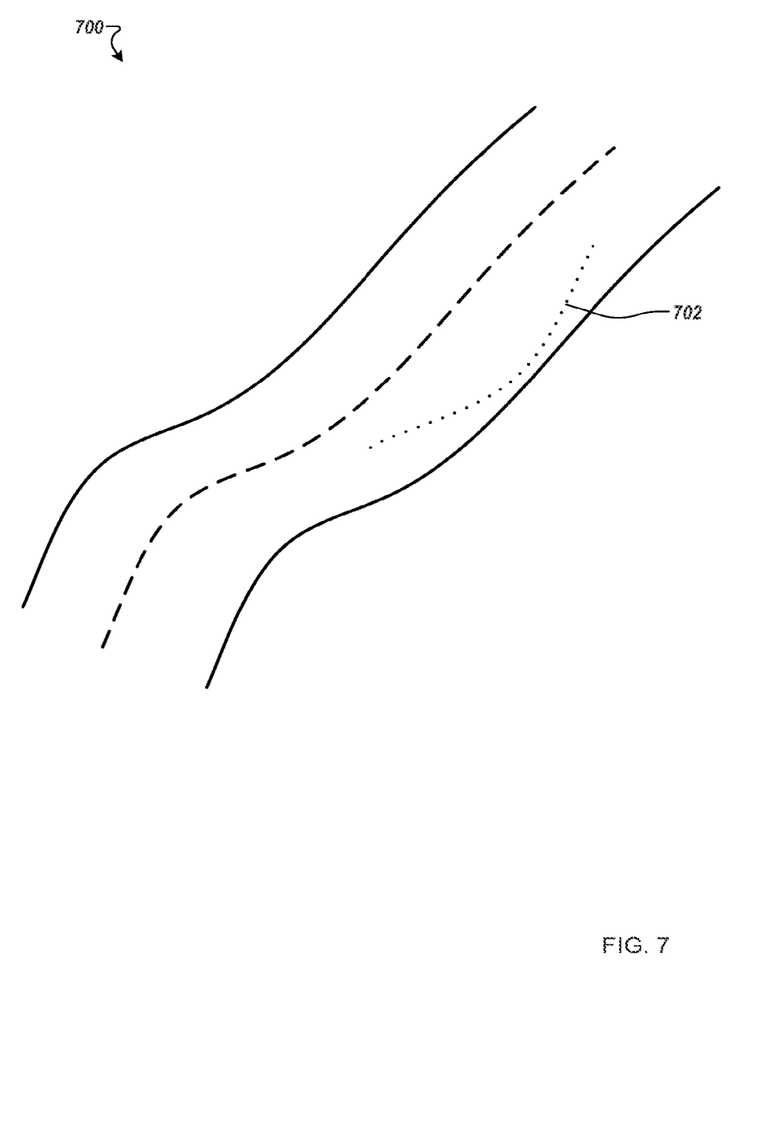
FIG. 7 is a schematic that shows supplemental alert information according to one example.

FIG. 7 is a schematic that shows supplemental supplementary alert information according to one example. As described previously herein, the supplemental supplementary alert information may include an actual footage (e.g., video, photo) or a schematic that indicates the cause of the alert. The schematic may be generated based on operation data (e.g., position, speed) of the vehicle. For example, a third schematic 700 shows the position of the vehicle in the driving lane. Trace 702 shows the vehicle veering from the driving lane. Thus, the driver may review the schematic and understands why the lane keep assist and warning system 202 was activated.

Figure 8:
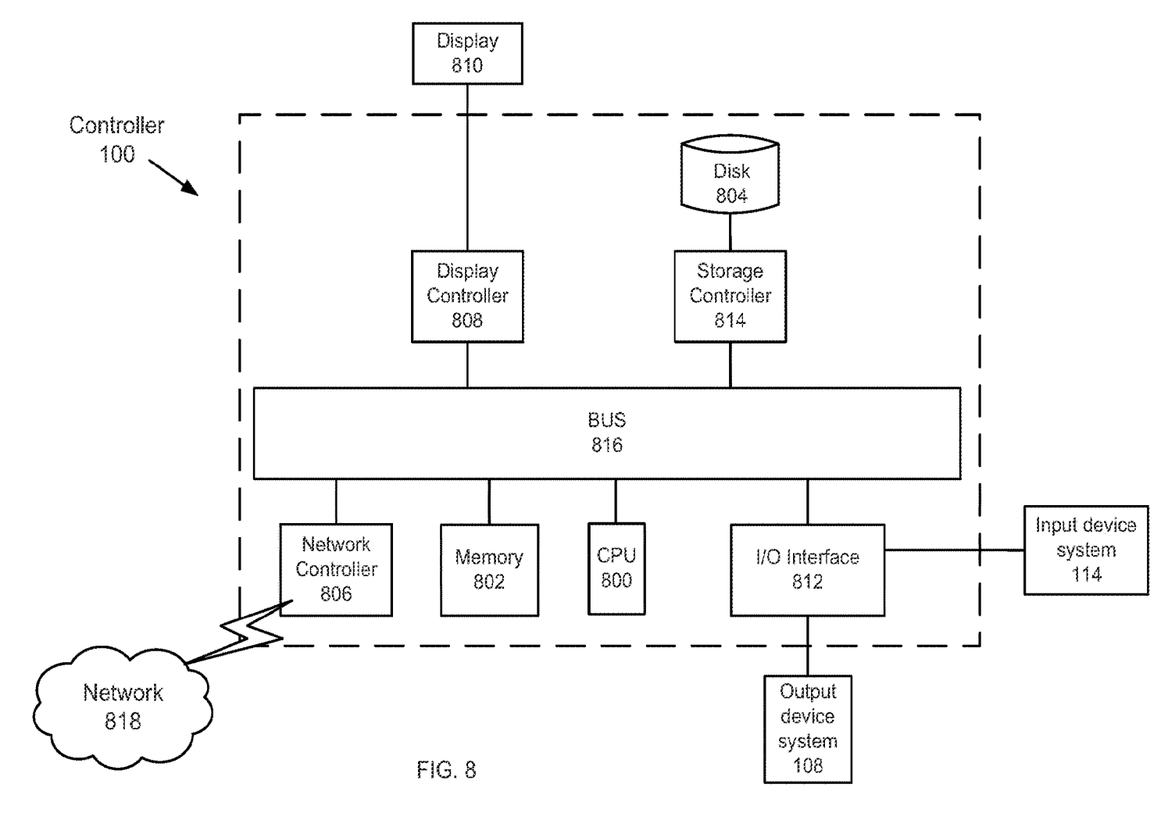
FIG. 8 is an exemplary block diagram of a controller according to one example.

Next, a hardware description of the controller 100 according to exemplary embodiments is described with reference to FIG. 8. In FIG. 8, the controller 100 includes a CPU 800 which performs the processes described herein. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 100 communicates, such as a server or computer.

Further, the claimed advancements may be provided as a utility application, background daemon, or component of an operating system, or combination thereof, executing in conjunction with CPU 800 and an operating system such as Microsoft Windows 7, UNIX, Solaris, LINUX, Apple MAC-OS and other systems known to those skilled in the art.

In order to achieve the controller 100, the hardware elements may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above. For example, FIG. 10 shows one implementation of CPU 800.

The controller 100 in FIG. 8 also includes a network controller 806, such as an Intel Ethernet PRO network interface card from Intel Corporation of America, for interfacing with network 818. As can be appreciated, the network 818 can be a public network, such as the Internet, or a private network such as LAN or WAN network, or any combination thereof and can also include PSTN or ISDN sub-networks. The network 818 can also be wired, such as an Ethernet network, or can be wireless such as a cellular network including EDGE, 3G and 4G wireless cellular systems. The wireless network can also be WiFi, Bluetooth, or any other wireless form of communication that is known.

The controller 100 further includes a display controller 908, such as a NVIDIA GeForce GTX or Quadro graphics adaptor from NVIDIA Corporation of America for interfacing with display 810. A general purpose I/O interface 812 interfaces with the output device system 108 as well as the input device 114.

The general purpose storage controller 814 connects the storage medium disk 804 with communication bus 816, which may be an ISA, EISA, VESA, PCI, or similar, for interconnecting all of the components of the controller 100. A description of the general features and functionality of the display 810, as well as the display controller 808, storage controller 814, network controller 806, and general purpose I/O interface 812 is omitted herein for brevity as these features are known.

In one implementation of CPU 800, the instruction register 938 retrieves instructions from the fast memory 940. At least part of these instructions are fetched from the instruction register 938 by the control logic 936 and interpreted according to the instruction set architecture of the CPU 800. Part of the instructions can also be directed to the register 932. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be supplementary alert into the register and/or stored in the fast memory 940. According to certain implementations, the instruction set architecture of the CPU 800 can use a reduced instruction set architecture, a complex instruction set architecture, a vector processor architecture, a very large instruction word architecture. Furthermore, the CPU 800 can be based on the Von Neuman model or the Harvard model. The CPU 800 can be a digital signal processor, an FPGA, an ASIC, a PLA, a PLD, or a CPLD. Further, the CPU 800 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 8, constitutes or includes specialized corresponding structure that is programmed or configured to perform the algorithms shown in FIGS. 4 and 5.

A system which includes the features in the foregoing description provides numerous advantages to users. In particular, the system and associated described herein provides supplementary alert after warnings and alerts are generated in a vehicle. The supplementary alert results in the user learning and avoiding the cause of the warning in the future, thereby increasing safety.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for providing supplementary alert information in a vehicle, the method comprising:
   controlling one or more systems in the vehicle to generate and present an alert to a user of the vehicle based on an obstacle detected from a surrounding of the vehicle, wherein the alert includes at least one of a semi or fully autonomous control of the vehicle and an automatic advanced driver assistance control of the vehicle, and the control of the vehicle includes control of a movement of a component of the vehicle;
   monitoring, using processing circuitry, the one or more systems in the vehicle to determine an alert mode when the alert is generated;
   identifying, using the processing circuitry, supplementary alert information associated with the alert mode, wherein the supplementary alert information explains that the obstacle caused the generation of the generated alert;
   outputting, using the processing circuitry, the supplementary alert information to the user of the vehicle;
   generating, using the processing circuitry, additional supplementary alert information associated with the alert mode, wherein the additional supplementary alert information is not included in the supplementary alert information and further describes the obstacle that caused the generation of the generated alert; and
   after the supplementary alert information is output and a predetermined condition of the vehicle is satisfied, outputting, using the processing circuitry, the additional supplementary alert information to the user of the vehicle.

2. The method of claim 1, further comprising:
   updating a count associated with the alert mode;
   determining whether the count is below a predetermined threshold; and
   outputting the supplementary alert information when the count is below the predetermined threshold.

3. The method of claim 1, wherein
   the additional supplementary alert information includes a footage captured by one or more cameras, and
   the footage shows the obstacle that caused the generation of the generated alert.

4. The method of claim 1, wherein the additional supplementary alert information includes a schematic generated as a function of positional data of the vehicle.

5. The method of claim 1, wherein the one or more systems includes at least one of a lane keep assist and warning system, a blind spot detection system, a forward crash warning system, a parking assist system, an automatic braking system, a lane change assist system, a rear cross traffic alert system, a pedestrian detection system, an animal detection system, a bicyclist detection system, a driver attention system, or any other advanced driver assistance system (ADAS).

6. The method of claim 1, wherein the supplementary alert information is in a visual format.

7. The method of claim 1, wherein the supplementary alert information is in an audio format.

8. The method of claim 1, further comprising:
storing a plurality of supplementary alert information associated with a plurality of alert modes.

9. The method of claim 1, further comprising:
storing predefined settings associated with a plurality of alert modes.

10. A system for providing supplementary alert information in a vehicle, the system comprising:
one or more alert systems; and
processing circuitry configured to
control the one or more alert systems to generate and present an alert to a user of the vehicle based upon an obstacle detected from a surrounding of the vehicle, wherein the alert includes at least one of a semi or fully autonomous control of the vehicle and an automatic advanced driver assistance control of the vehicle, and the control of the vehicle includes control of a movement of a component of the vehicle,
monitor the one or more alert systems to determine an alert mode when the alert is generated,
identify supplementary alert information associated with the alert mode, wherein the supplementary alert information explains that the obstacle caused the generation of the generated alert,
output the supplementary alert information to the user of the vehicle,
generate additional supplementary alert information associated with the alert mode, wherein the additional supplementary alert information is not included in the supplementary alert information and further describes the obstacle that caused the generation of the generated alert; and
after the supplementary alert information is output and a predetermined condition of the vehicle is satisfied, output the additional supplementary alert information to the user of the vehicle.

11. The system of claim 10, wherein the processing circuitry is further configured to:
update a count associated with the alert mode;
determine whether the count is below a predetermined threshold; and
output the supplementary alert information when the count is below the predetermined threshold.

12. The system of claim 10, wherein
the additional supplementary alert information includes a footage captured by one or more cameras, and
the footage shows the obstacle that caused the generation of the generated alert.

13. The system of claim 10, wherein the additional supplementary alert information includes a schematic generated as a function of positional data of the vehicle.

14. The system of claim 10, wherein the one or more alert systems includes at least one of a lane keep assist and warning system, a blind spot detection system, a forward crash warning system, a parking assist system, an automatic braking system, a lane change assist system, a rear cross traffic alert system, a pedestrian detection system, an animal detection system, a bicyclist detection system, and a driver attention system.

15. A non-transitory computer readable medium storing computer-readable instructions therein which when executed by a computer cause the computer to perform a method for providing supplementary alert information, the method comprising:
controlling one or more systems in a vehicle to generate and present an alert to a user of the vehicle based on an obstacle detected from a surrounding of the vehicle, wherein the alert includes at least one of a semi or fully autonomous control of the vehicle and an automatic advanced driver assistance control of the vehicle, and the control of the vehicle includes control of a movement of a component of the vehicle;
monitoring the one or more systems in the vehicle to determine an alert mode when the alert is generated;
identifying supplementary alert information associated with the alert mode, wherein the supplementary alert information explains that the obstacle caused the generation of the generated alert;
outputting the supplementary alert information to the user of the vehicle;
generating additional supplementary alert information associated with the alert mode, wherein the additional supplementary alert information is not included in the supplementary alert information and further describes the obstacle that caused the generation of the generated alert; and,
after the supplementary alert information is output and a predetermined condition of the vehicle is satisfied, outputting the additional supplementary alert information to the user of the vehicle.

16. The method of claim 3, wherein the predetermined condition is satisfied when the vehicle is moving slower than a predetermined speed.

17. The method of claim 16, wherein the predetermined condition is satisfied when the vehicle is stopped.

* * * * *